United States Patent
Kato et al.

(10) Patent No.: US 9,962,868 B2
(45) Date of Patent: May 8, 2018

(54) DEVICE FOR FORMING FOAMED KNEADED MATERIAL AND METHOD FOR FORMING FOAMED KNEADED MATERIAL

(71) Applicants: SINTOKOGIO, LTD., Nagoya-shi, Aichi (JP); TOYOTA JIDOSHA KABUSHIKI KAISHA, Toyota-shi, Aichi (JP)

(72) Inventors: Yusuke Kato, Toyokawa (JP); Toshihiko Zenpo, Toyokawa (JP); Toshio Kanno, Toyokawa (JP); Hirotsune Watanabe, Toyota (JP); Tomokazu Suda, Toyota (JP); Yasutake Nagata, Toyota (JP); Masaomi Mitsutake, Toyota (JP); Takumi Maegawa, Toyota (JP)

(73) Assignees: SINTOKOGIO, LTD., Nagoya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 574 days.

(21) Appl. No.: 14/410,003

(22) PCT Filed: Apr. 11, 2013

(86) PCT No.: PCT/JP2013/060988
§ 371 (c)(1),
(2) Date: Dec. 19, 2014

(87) PCT Pub. No.: WO2014/002578
PCT Pub. Date: Jan. 3, 2014

(65) Prior Publication Data
US 2015/0197044 A1    Jul. 16, 2015

(30) Foreign Application Priority Data
Jun. 25, 2012    (JP) .................................. 2012-142332

(51) Int. Cl.
B29C 44/02    (2006.01)
B01F 3/04    (2006.01)
(Continued)

(52) U.S. Cl.
CPC .......... B29C 44/02 (2013.01); B01F 3/04446 (2013.01); B01F 15/0237 (2013.01); B22C 15/08 (2013.01)

(58) Field of Classification Search
CPC .. B29C 31/063; B29C 31/068; B29C 43/3444
See application file for complete search history.

(56) References Cited

U.S. PATENT DOCUMENTS 3,995,734 A * 12/1976 Berg, Jr. ............... A01K 1/0142
100/179
4,411,609 A * 10/1983 Yoshii ..................... B29C 45/77
425/149
(Continued)

FOREIGN PATENT DOCUMENTS

EP    1749598 A1    2/2007
EP    1897633 A1    3/2008
(Continued)

Primary Examiner — Matthew J Daniels
Assistant Examiner — Kelsey C Grace
(74) Attorney, Agent, or Firm — Oliff PLC

(57) ABSTRACT

First, a supply device supplies a foamed kneaded material into a cylinder. Then, in a state in which an internal space of the cylinder is communicated with a pattern forming space of a mold, the piston disposed in the cylinder is moved toward the foamed kneaded material side while opening a gas release hole formed piercing through the piston. Then, at a timing when the piston has reached an expected position where the piston is expected to be on contacting the foamed kneaded material supplied into the cylinder, the gas release hole is closed by an open-close plug. Then, the foamed kneaded material supplied into the cylinder is pressed (Continued)

toward the pattern forming space side of the mold by moving the piston toward the foamed kneaded material side.

13 Claims, 6 Drawing Sheets

(51) Int. Cl.
　　　*B01F 15/02*　　　(2006.01)
　　　*B22C 15/08*　　　(2006.01)

(56) References Cited

U.S. PATENT DOCUMENTS

| | | | |
|---|---|---|---|
| 5,204,042 A * | 4/1993 | James | B29C 70/443 264/257 |
| 2010/0140823 A1 | 6/2010 | Asano et al. | |

FOREIGN PATENT DOCUMENTS

| | | |
|---|---|---|
| JP | 2004276092 A | 10/2004 |
| JP | A-2006-289376 | 10/2006 |
| WO | 2005/089984 A1 | 9/2005 |
| WO | 2006/134841 A1 | 12/2006 |
| WO | 2007/066509 A1 | 6/2007 |

\* cited by examiner

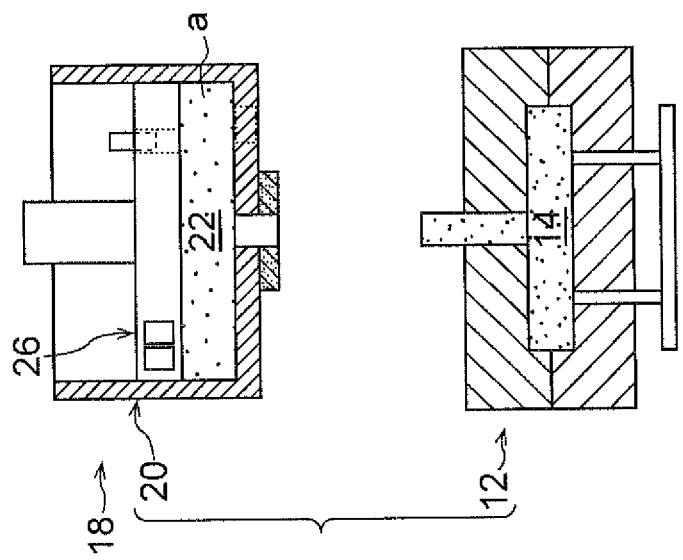
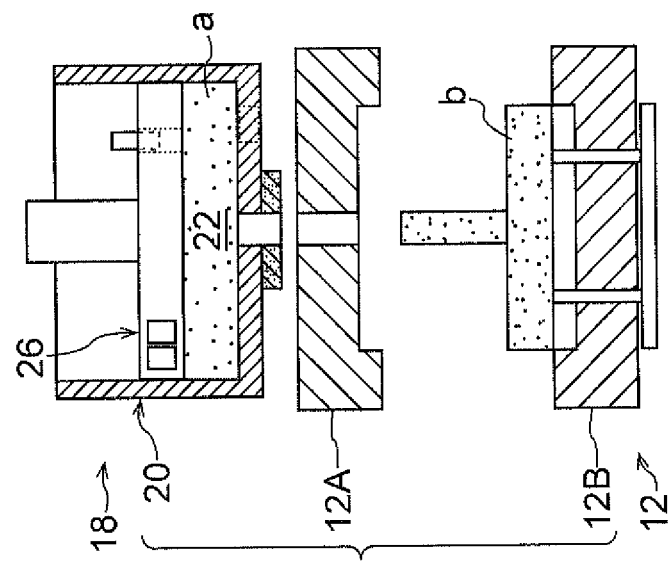

DEVICE FOR FORMING FOAMED KNEADED MATERIAL AND METHOD FOR FORMING FOAMED KNEADED MATERIAL

TECHNICAL FIELD

The present invention relates to a device for forming foamed kneaded material and a method for forming foamed kneaded material.

BACKGROUND ART

There is a method in which foamed kneaded material is filled into a pattern forming space of a mold, and hardened to form a pattern (see, for example, Patent Document 1).

RELATED PUBLICATIONS

Patent Documents

Patent Document 1: Japanese Patent Application Laid-Open (JP-A) No. 2006-289376

SUMMARY OF INVENTION

Technical Problem

However, there is room for improvement in respect to the point of filling the pattern forming space of the mold with the foamed kneaded material that is in a well foamed condition.

In view of the above circumstances, an object of the present invention is to obtain a device for forming foamed kneaded material and a method for forming foamed kneaded material that are capable of filling a pattern forming space of a mold with foamed kneaded material in a well foamed condition.

Solution to Problem

A device for forming foamed kneaded material according to a first aspect of the present invention includes: a mold having a pattern forming space and a fill hole; a cylinder having an internal space capable of being supplied with foamed kneaded material, the internal space communicating with the pattern forming space by connecting the cylinder to the fill hole; a piston that presses foamed kneaded material supplied into the cylinder toward the pattern forming space side of the mold; an advancing-retreating movement mechanism that is provided at the piston, and that advances or retreats the piston in a direction to press the foamed kneaded material supplied into the cylinder or in the opposite direction thereto; a gas release mechanism including a gas release hole that penetrates through the piston along a piston advancing-retreating movement direction, an open-close section that is capable of moving between a closed position that closes the gas release hole and an open position that opens the gas release hole, and an open-close drive mechanism that moves the open-close section between the closed position and the open position; a position detection section that detects a position of the piston in the cylinder; and a controller that controls the open-close drive mechanism such that the open-close section is disposed in the open position in cases in which it has been determined, based on a detection result of the position detection section, that the piston has not yet reached an expected position where the piston is expected to be positioned on contacting the foamed kneaded material supplied into the cylinder, and that controls the open-close drive mechanism such that the open-close section is disposed in the closed position in cases in which it has been determined, based on a detection result of the position detection section, that the piston has reached the expected position.

According to the device for forming foamed kneaded material according to the first aspect of the present invention, the cylinder communicates the internal space with the pattern forming space of the mold by connecting to the fill hole of the mold. The inner side of the cylinder is capable of being supplied with the foamed kneaded material, and the foamed kneaded material supplied into the cylinder is pressed by the piston toward the pattern forming space side of the mold. The piston is advanced or retreated in a direction to press the foamed kneaded material supplied into the cylinder or in the opposite direction thereto by the advancing-retreating movement mechanism, and the position of the piston in the cylinder is detected by the position detection section. The gas release hole is formed piercing the piston in the piston advancing-retreating direction, and the open-close section of the gas release mechanism is moveable by the open-close drive mechanism between the closed position that closes the gas release hole and the open position that opens the gas release hole.

The controller controls the open-close drive mechanism such that the open-close section is disposed in the open position in cases in which it has been determined, based on a detection result of the position detection section, that the piston has not yet reached the expected position where the piston is expected to be positioned on contacting the foamed kneaded material supplied into the cylinder. The controller controls the open-close drive mechanism such that the open-close section is disposed in the closed position in cases in which it has been determined, based on a detection result of the position detection section, that the piston has reached the expected position. Accordingly, first, air between the cylinder inner side and the piston is discharged from the gas release hole, and then the piston fills the foamed kneaded material into the pattern forming space of the mold with an appropriate pressing force, without the foamed kneaded material leaking out from the gas release hole.

A device for forming foamed kneaded material according to a second aspect of the present invention includes: a mold having a pattern forming space and a fill hole; a cylinder having an internal space capable of being supplied with foamed kneaded material, the internal space communicating with the pattern forming space by connecting the cylinder to the fill hole; a piston that presses foamed kneaded material supplied into the cylinder toward the pattern forming space side of the mold; an advancing-retreating movement mechanism that is provided at the piston, and that advances or retreats the piston in a direction to press the foamed kneaded material supplied into the cylinder or in the opposite direction thereto; a gas release mechanism including a gas release hole that penetrates through the piston along a piston advancing-retreating movement direction, an open-close section that is capable of moving between a closed position that closes the gas release hole and an open position that opens the gas release hole, and an open-close drive mechanism that moves the open-close section between the closed position and the open position; a pressure detection section that detects pressing force acting on the foamed kneaded material in the cylinder; and a controller that controls the open-close drive mechanism such that the open-close section is disposed in the open position in cases in which a pressure value detected by the pressure detection section is less than an expected pressure value associated with the foamed kneaded material starting to be pressed by the piston, and that controls the open-close drive mechanism such that the open-close section is disposed in the closed position in cases in which a pressure value detected by the pressure detection section is the expected pressure value, or higher.

According to the device for forming foamed kneaded material according to the second aspect of the present invention, the cylinder communicates the internal space with the pattern forming space of the mold by connecting to the fill hole of the mold. The inner side of the cylinder is capable of being supplied with the foamed kneaded material, and the foamed kneaded material supplied into the cylinder is pressed by the piston toward the pattern forming space side of the mold. The piston is advanced or retreated in a direction to press the foamed kneaded material supplied into the cylinder or in the opposite direction thereto by the advancing-retreating movement mechanism, and the pressing force acting on the foamed kneaded material inside the cylinder is detected by the position detection section. The gas release hole is formed piercing the piston in the piston advancing-retreating direction, and the open-close section of the gas release mechanism is moveable by the open-close drive mechanism between the closed position that closes the gas release hole and the open position that opens the gas release hole.

The controller controls the open-close drive mechanism such that the open-close section is disposed in the open position in cases in which a pressure value detected by the pressure detection section is less than the expected pressure value associated with the foamed kneaded material starting to be pressed by the piston. The controller controls the open-close drive mechanism such that the open-close section is disposed in the closed position in cases in which a pressure value detected by the pressure detection section is the expected pressure value, or higher. Accordingly, first, air between the cylinder inner side and the piston is discharged from the gas release hole, and then the piston fills the foamed kneaded material into the pattern forming space of the mold with an appropriate pressing force, without the foamed kneaded material leaking out from the gas release hole.

A third aspect of the present invention is the device for forming foamed kneaded material according to the first aspect, wherein: a pressure detection section is provided to detect pressing force acting on the foamed kneaded material in the cylinder; and in cases in which it has been determined, based on the detection result of the position detection section, that the piston has reached the expected position, the controller controls the advancing-retreating movement mechanism such that movement of the piston is stopped in cases in which a pressure value detected by the pressure detection section is an expected pressure value associated with completion of the foamed kneaded material being pressed by the piston, or higher.

According to the device for forming foamed kneaded material according to the third aspect of the present invention, the pressing force acting on the foamed kneaded material in the cylinder is detected by the pressure detection section. In cases in which it has been determined, based on the detection result of the position detection section, that the piston has reached the expected position, the controller controls the advancing-retreating movement mechanism such that movement of the piston is stopped in cases in which a pressure value detected by the pressure detection section is the expected pressure value associated with completion of the foamed kneaded material being pressed by the piston, or higher. Thus unnecessary pressing force accordingly does not act on the foamed kneaded material supplied into the cylinder, enabling burring to be prevented from occurring on the pattern. Moreover, in cases in which the pressure value detected by the pressure detection section is less than the expected pressure value associated with completion of the foamed kneaded material being pressed by the piston, insufficient filling can be prevented by continuing the pressing of the piston.

A fourth aspect of the present invention is the device for forming foamed kneaded material according to the second aspect, wherein: a position detection section is provided at detect the position of the piston in the cylinder; and in cases in which it has been determined, based on the detection result of the position detection section, that the piston has reached an expected position where the piston is expected to be on contacting the foamed kneaded material supplied into the cylinder, the controller controls the advancing-retreating movement mechanism such that movement of the piston is stopped in cases in which a pressure value detected by the pressure detection section is an expected pressure value associated with completion of the foamed kneaded material being pressed by the piston, or higher.

According to the device for forming foamed kneaded material according to the fourth aspect of the present invention, the position of the piston inside the cylinder is detected by the position detection section. In cases in which it has been determined, based on the detection result of the position detection section, that the piston has reached the expected position where the piston is expected to be on contacting the foamed kneaded material supplied into the cylinder, the controller controls the advancing-retreating movement mechanism such that movement of the piston is stopped in cases in which a pressure value detected by the pressure detection section is the expected pressure value associated with completion of the foamed kneaded material being pressed by the piston, or higher. Thus unnecessary pressing force accordingly does not act on the foamed kneaded material supplied into the cylinder, enabling burring to be prevented from occurring on the pattern. Moreover, in cases in which the pressure value detected by the pressure detection section is less than the expected pressure value associated with completion of the foamed kneaded material being pressed by the piston, insufficient filling can be prevented by continuing the pressing of the piston.

A fifth aspect of the present invention is the device for forming foamed kneaded material according to any one of the first aspect to the fourth aspect, wherein a speed detection section is provided to detect a movement speed of the piston, and the controller controls the advancing-retreating movement mechanism such that a movement speed detected by the movement speed detection section matches a pre-set movement speed of the piston.

According to the device for forming foamed kneaded material according to the fifth aspect of the present invention, the movement speed of the piston is detected by the speed detection section. The controller controls the advancing-retreating movement mechanism such that the movement speed detected by the movement speed detection section matches the pre-set movement speed of the piston. The piston can accordingly be moved at a desired speed during filling the foamed kneaded material into the mold, thereby enabling the piston to be moved at a speed that enables the foamed condition of the foamed kneaded material to be maintained and at which burring is not liable to occur.

A sixth aspect of the present invention is the device for forming foamed kneaded material according to any one of the first aspect to the fifth aspect, wherein the controller controls the advancing-retreating movement mechanism such that a movement speed of the piston, in cases in which the open-close section is in the closed position, is slower than a movement speed of the piston in cases in which the open-close section is in the open position.

According to the device for forming foamed kneaded material according to the sixth aspect of the present invention, the controller controls the advancing-retreating movement mechanism such that the movement speed of the piston, in cases in which the open-close section is in the closed position, is slower than the movement speed of the piston in cases in which the open-close section is in the open position. In this manner, the processing time is shortened by the movement speed of the piston when the open-close section is in the open position (or in other words, prior to the piston contacting the foamed kneaded material) being a faster speed than the movement speed of the piston when the open-close section is in the closed position (or in other words, after the piston has contacted the foamed kneaded material). The occurrence of poor filling and burring due to the filling speed being too fast is suppressed by making the movement speed of the piston when the open-close section is in the closed position (or in other words, after the piston has contacted the foamed kneaded material) to be slower than the movement speed of the piston when the open-close section is in the open position (or in other words, prior to the piston contacting the foamed kneaded material).

A method for forming foamed kneaded material according to a seventh aspect of the present invention is a method including: a first process in which foamed kneaded material is supplied into a cylinder; a second process in which, after the first process, in a state in which an internal space of the cylinder is communicated with a pattern forming space of a mold, a piston disposed in the cylinder is moved toward the foamed kneaded material side while opening a gas release hole formed to penetrate through the piston; a third process in which, after the second process, the gas release hole is closed at a timing when the piston has reached an expected position where the piston is expected to be positioned on contacting the foamed kneaded material supplied into the cylinder; and a fourth process in which, after the third process, the foamed kneaded material supplied into the cylinder is pressed toward the pattern forming space side of the mold by moving the piston toward the foamed kneaded material side.

According to the method for forming foamed kneaded material according to the seventh aspect of the present invention, in the first process, the foamed kneaded material is supplied into a cylinder. In the second process, after the first process, in a state in which the internal space of the cylinder is communicated with the pattern forming space of the mold, the piston disposed in the cylinder is moved toward the foamed kneaded material side while opening the gas release hole formed to penetrate through the piston. Air between the foamed kneaded material and the piston is accordingly discharged from the gas release hole. In the third process, after the second process, the gas release hole is closed at a timing when the piston has reached an expected position where the piston is expected to be positioned on contacting the foamed kneaded material supplied into the cylinder. In the fourth process, after the third process, the foamed kneaded material supplied into the cylinder is pressed toward the pattern forming space side of the mold by moving the piston toward the foamed kneaded material side. When this occurs, the gas release hole is closed, and so the piston fills the pattern forming space of the mold with foamed kneaded material with an appropriate pressing force without leaks occurring in the foamed kneaded material from the gas release hole.

A method for forming foamed kneaded material according to the eighth aspect of the present invention is a method including: a first process in which foamed kneaded material is supplied into a cylinder; a second process in which, after the first process, in a state in which an internal space of the cylinder is communicated with a pattern forming space of a mold, a piston disposed in the cylinder is moved toward the foamed kneaded material side while opening a gas release hole formed to penetrate through the piston; a third process in which, after the second process, the gas release hole is closed at a timing when a pressing force acting on the foamed kneaded material has reached an expected pressure value associated with the foamed kneaded material starting to be pressed by the piston; and a fourth process in which, after the third process, the foamed kneaded material supplied into the cylinder is pressed toward the pattern forming space side of the mold by moving the piston toward the foamed kneaded material side.

According to the method for forming foamed kneaded material according to the eighth aspect of the present invention, in the first process, foamed kneaded material is supplied into a cylinder. In the second process, after the first process, in a state in which an internal space of the cylinder is communicated with the pattern forming space of the mold, the piston disposed in the cylinder is moved toward the foamed kneaded material side while opening the gas release hole formed to penetrate through the piston. Air between the foamed kneaded material and the piston is accordingly discharged from the gas release hole. Then, in the third process, after the second process, the gas release hole is closed at a timing when the pressing force acting on the foamed kneaded material has reached the expected pressure value associated with the foamed kneaded material starting to be pressed by the piston. In the fourth process, after the third process, the foamed kneaded material supplied into the cylinder is pressed toward the pattern forming space side of the mold by moving the piston toward the foamed kneaded material side. When this occurs, the gas release hole is closed, and so the piston fills the pattern forming space of the mold with foamed kneaded material with an appropriate pressing force without leaks occurring in the foamed kneaded material from the gas release hole.

A ninth aspect of the present invention is the method for forming foamed kneaded material of the seventh aspect or the eighth aspect, wherein a movement speed of the piston in the fourth process is slower than a movement speed of the piston in the second process.

According to the method for forming foamed kneaded material according to the ninth aspect of the present invention, the movement speed of the piston in the fourth process is made a slower speed than the movement speed of the piston in the second process. The processing time is shortened by making the movement speed of the piston in the second process to be faster than the movement speed of the piston in the fourth process. The occurrence of poor filling and burring due to the filling speed being too fast is suppressed by making the movement speed of the piston in the fourth process to be slower than the movement speed of the piston in the second process.

Advantageous Effects of Invention

As explained above, according to the device for forming foamed kneaded material and the method for forming foamed kneaded material according to the present invention, the excellent advantageous effect is exhibited of enabling a pattern forming space of a mold to be filled with foamed kneaded material in a well foamed condition.

BRIEF DESCRIPTION OF DRAWINGS

FIG. 3A is a schematic vertical cross-section illustrating a cylinder and the like withdrawn to above a mold in a process of a method for forming foamed kneaded material employing a device for forming foamed kneaded material according to the first exemplary embodiment of the present invention.

FIG. 3B is a schematic vertical cross-section illustrating a state in which a formed pattern has been removed from a mold in a process of a method for forming foamed kneaded material employing a device for forming foamed kneaded material according to the first exemplary embodiment of the present invention.

DESCRIPTION OF EMBODIMENTS

First Exemplary Embodiment

Explanation follows regarding a device for forming foamed kneaded material and a method for forming foamed kneaded material according to a first exemplary embodiment of the present invention, with reference to FIG. 1 to FIG. 4. A foamed kneaded material is a kneaded material of solid particles and a foamed liquid (also referred to as a foam aggregate mixture), and the foam aggregate mixture is indicated by symbol a in FIG. 2A to FIG. 2D, FIG. 3A, FIG. 3B, and FIG. 4.

Figure 1:
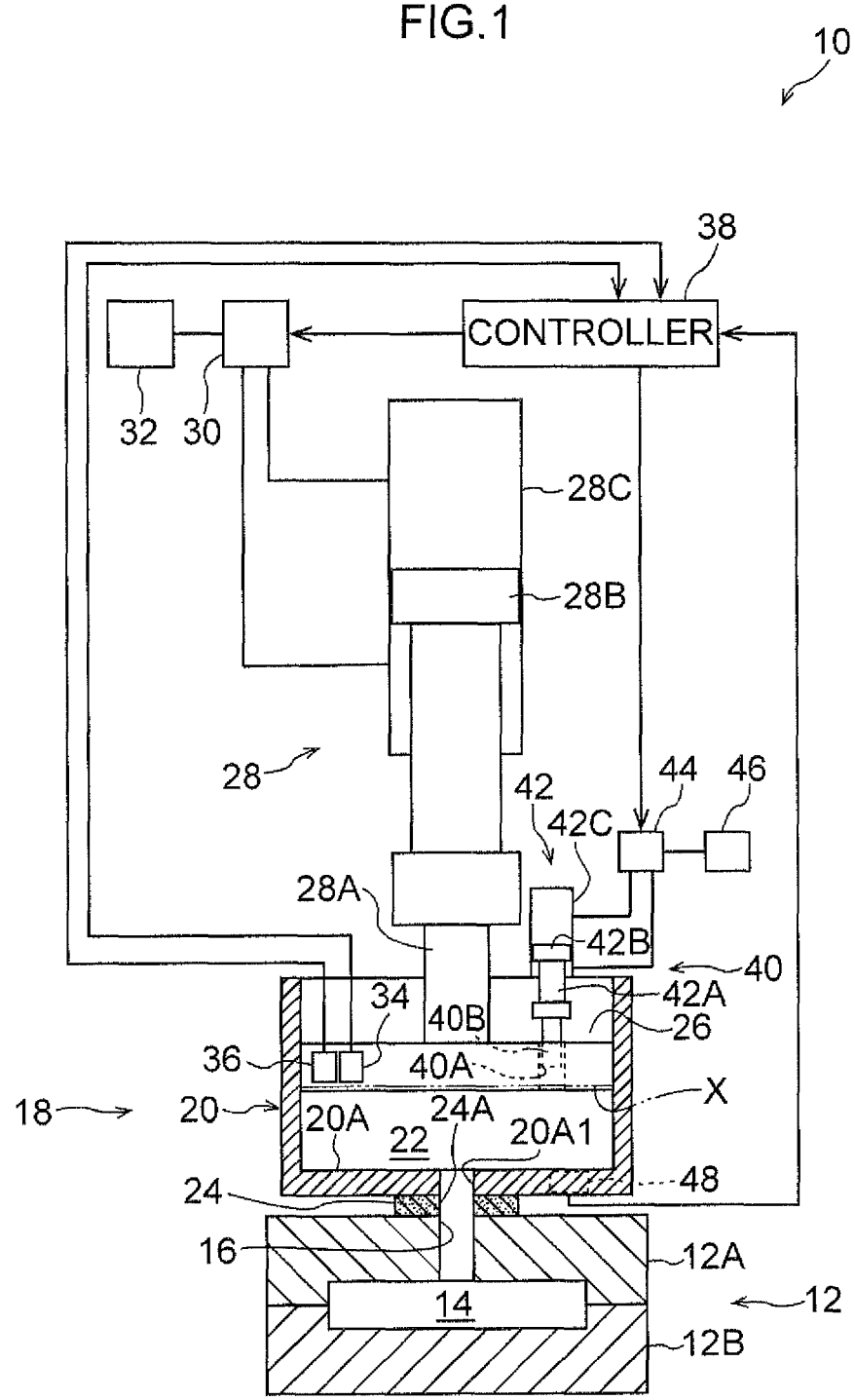
FIG. 1 is a schematic vertical cross-section illustrating relevant portions of a device for forming foamed kneaded material according to a first exemplary embodiment of the present invention.

As illustrated in FIG. 1, a foamed kneaded material forming device 10 includes a mold 12. The mold 12 is configured including an upper mold 12A and a lower mold 12B, forming a pattern forming space 14 (also referred to as a cavity). A filling hole 16 is formed in the upper mold 12A of the mold 12, configuring an input port to the pattern forming space 14.

A pressurizing unit 18 is installable above the mold 12. The pressurizing unit 18 includes a cylinder 20. In the cylinder 20 an internal space 22 is formed into which it is possible to supply foamed kneaded material. The cylinder 20 is connected to the filling hole 16 of the mold 12 through a thermal insulation material 24, such that the internal space 22 is in communication with the pattern forming space 14. Namely, a fill hole 20A1 is formed piercing through a bottom section 20A of the cylinder 20, and a fill hole 24A is also formed piercing through the thermal insulation material 24. In an installed state of the pressurizing unit 18, the fill holes 20A1, 24A are set so as to be positioned above the filling hole 16 of the mold 12.

A piston 26 that presses foamed kneaded material fed into the cylinder 20 toward the pattern forming space 14 side of the mold 12 is capable of being disposed inside the cylinder 20. The piston 26 is configured in a short cylindrical shape, and the internal space 22 of the cylinder 20 is partitioned by the piston 26 into two chambers, an upper and a lower chamber.

The piston 26 is attached to a leading end portion (lower end portion) of a rod 28A of an advancing-retreating movement mechanism 28 (air cylinder mechanism), and the rod 28A is disposed with its axial direction along the up-down direction. A base end portion (upper end portion) of the rod 28A is fixed to a piston 28B. The piston 28B is capable of to-and-fro movement inside a cylinder 28C by pneumatics (more broadly defined as fluid pressure). Namely, in the pressurizing unit 18, the relative position of the piston 26 with respect to the cylinder 20 is variable by the piston 28B moving to-and-fro and extending or contracting the rod 28A. An air supply source 32 is connected to the cylinder 28C through an air direction control device (solenoid valve or the like) 30, and the air direction control device 30 is connected to a controller 38. The controller 38 is configured, for example, with an electronic circuit including a CPU or the like, so as to be capable of controlling the movement of the piston 28B by controlling the air direction control device 30. Due to configuration as described above, the advancing-retreating movement mechanism 28 provided at the piston 26 is capable of advancing or retreating the piston 26 in a direction to press the foamed kneaded material supplied into the cylinder 20 (the direction toward the bottom section 20A side), and in the opposite direction thereto.

A position detection sensor 34 is provided at the piston 26 as a position detection section to detect the position of the piston 26 within the cylinder 20. The position detection sensor 34 is connected to the controller 38, and outputs a signal to the controller 38 according to the up-down direction position of the piston 26 within the cylinder 20.

A speed detection sensor 36 is provided at the piston 26 as a speed detection section to detect the movement speed of the piston 26. The speed detection sensor 36 is connected to the controller 38, and outputs a signal to the controller 38 according to the movement speed of the piston 26. In response thereto, the controller 38 controls the advancing-retreating movement mechanism 28 such that the movement speed detected by the speed detection sensor 36 matches a pre-set movement speed of the piston 26.

A gas release mechanism 40 (air release mechanism) is provided at the piston 26. The gas release mechanism 40 is equipped with a gas release hole 40A (air release hole) piercing through the piston 26 in its advancing-retreating direction (plate thickness direction), and an open-close plug 40B that serves as an opening and closing section employed to open or close the gas release hole 40A. Namely, the gas release hole 40A forms a communication path that communicates the lower side space of the piston 26 with the upper side space of the piston 26, and the open-close plug 40B is moveable between a closed position closing the gas release hole 40A and an open position opening the gas release hole 40A.

The open-close plug 40B is attached to a leading end portion (lower end portion) of a rod 42A of an open-close drive mechanism 42 (air cylinder mechanism). The base end portion (upper end portion) of the rod 42A is fixed to a piston 42B, and the piston 42B is capable of to-and-fro movement within a cylinder 42C by pneumatics (more broadly defined as fluid pressure). Namely, the relative position of the open-close plug 40B with respect to the gas release hole 40A is variable by the piston 42B moving to-and-fro and extending or contracting the rod 42A. The piston 42B is connected to an air supply source 46 through an air direction control device (solenoid valve or the like) 44, and the air direction control device 44 is connected to the controller 38. The controller 38 is configured capable of controlling the movement of the piston 42B by controlling the air direction control device 44. Due to configuration as described above, the open-close drive mechanism 42 provided at the open-close plug 40B is capable of moving the open-close plug 40B between a closed position closing the gas release hole 40A (the position indicated in FIG. 1) and an open position opening the gas release hole 40A (see FIG. 2A).

The controller 38 controls the open-close drive mechanism 42 such that the open-close plug 40B is disposed in the open position in cases in which it is determined, based on the detection result of the position detection sensor 34, that the position of the piston 26 has not yet reached an expected position X of the piston 26 where the piston 26 is expected to contact the foamed kneaded material supplied into the cylinder 20. The controller 38 also controls the open-close drive mechanism 42 such that the open-close plug 40B is disposed in the closed position in cases in which it is determined, based on the detection result of the position detection sensor 34, that the position of the piston 26 has reached the expected position X.

In the present exemplary embodiment, the controller 38 controls the advancing-retreating movement mechanism 28 such that the movement speed of the piston 26 is decelerated when the open-close plug 40B is in the closed position to less than the movement speed of the piston 26 when the open-close plug 40B is in the open position.

A pressure detection sensor 48 is provided as a pressure detection section to the bottom section 20A of the cylinder 20. The pressure detection sensor 48 detects the pressing force acting on the foamed kneaded material inside the cylinder 20. The pressure detection sensor 48 is connected to the controller 38, and outputs a signal according to the pressing force acting on the foamed kneaded material inside the cylinder 20 to the controller 38.

In response thereto, the controller 38 controls the advancing-retreating movement mechanism 28 such that the pressure value detected by the pressure detection sensor 48 matches a pre-set pressure value (for the piston 26 to press the foamed kneaded material). In cases in which it is determined, based on the detection result of the position detection sensor 34, that the piston 26 has reached the expected position X, the controller 38 controls the advancing-retreating movement mechanism 28 to stop movement of the piston 26 if the pressure value detected by the pressure detection sensor 48 is a pressure value expected when the piston 26 has completed pressing the foamed kneaded material (a pressing complete state), or higher.

Figure 4:
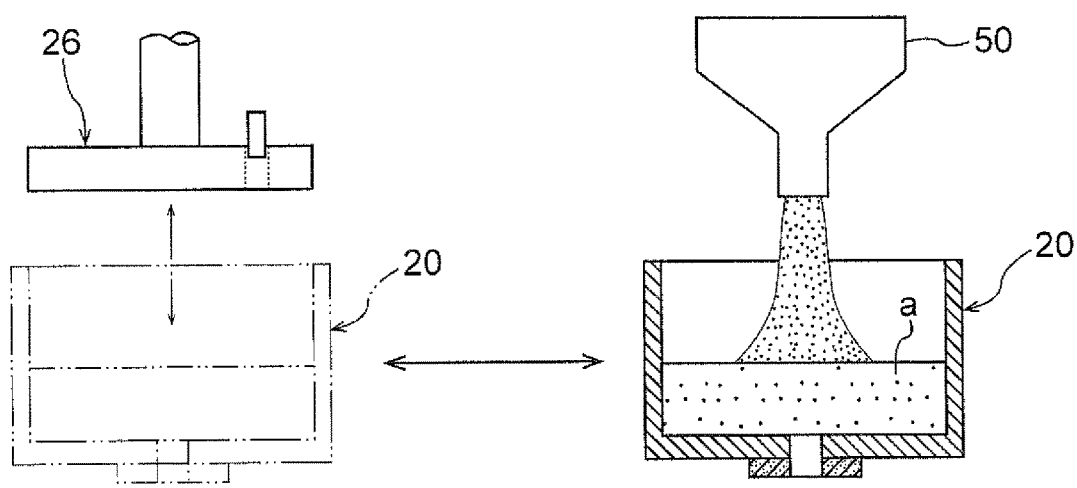
FIG. 4 is schematic vertical cross-section illustrating a state in which foamed kneaded material is being supplied into a cylinder in a device for forming foamed kneaded material according to the first exemplary embodiment of the present invention.

A supply device 50 illustrated in FIG. 4 is disposed above the position of the cylinder 20 illustrated in FIG. 1 (a filling position), and at a position moved therefrom in the horizontal direction. The supply device 50 is a device that supplies the foamed kneaded material a into the cylinder 20. As a modified example, in some cases an agitator (not illustrated in the drawings) is provided inside the cylinder 20 to obtain the foamed kneaded material inside the cylinder 20, and material that is not foamed is supplied into the cylinder 20 from a supply device.

A movement mechanism, not illustrated in the drawings, is provided at the cylinder 20. The movement mechanism is configured to move the cylinder 20 between the filling position illustrated in FIG. 1, and a supply position below the supply device 50 illustrated in FIG. 4. A known configuration may be applied to the configuration of the movement mechanism, and so detailed explanation thereof is omitted, however it is provided with a raising and lowering mechanism to raise and lower the cylinder 20 with the filling position illustrated in FIG. 1 as the lowermost position, and with a horizontal movement mechanism that horizontally moves between an uppermost position of the cylinder 20 raised by the raising and lowering mechanism (illustrated by the double dash broken lines in FIG. 4) and the supply position illustrated in FIG. 4. An example of a mechanism that may be applied to the raising and lowering mechanism and the horizontal movement mechanism is a mechanism including guide rails, sliders, pinions, racks, and drive motors, etc.

Method for Forming Foamed Kneaded Material and Operation and Advantageous Effects Thereof Explanation next follows regarding operation and advantageous effects of the above exemplary embodiment, while explaining a method for forming foamed kneaded material employing the foamed kneaded material forming device 10 illustrated in FIG. 1.

First, as illustrated in FIG. 4, the supply device 50 supplies the foamed kneaded material a into the cylinder 20 (first process). In the present exemplary embodiment, as an example, the foamed kneaded material a is initially supplied into the cylinder 20 at an amount that enables the mold 12 to be filled plural times (see FIG. 1). Then, a fill amount of one-time's worth of the foamed kneaded material a is replenished each time while filling the mold 12 (see FIG. 1) from the cylinder 20.

Figure 2A:
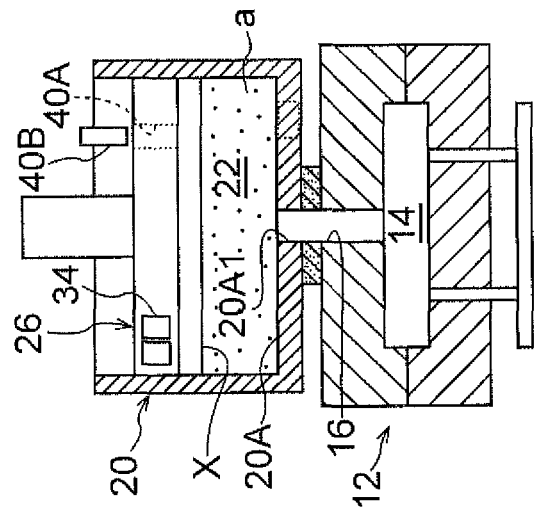
FIG. 2A is a schematic vertical cross-section illustrating a gas releasing state in a process of a method for forming foamed kneaded material employing a device for forming foamed kneaded material according to the first exemplary embodiment of the present invention.

Then, the cylinder 20 is moved by the movement mechanism, not illustrated in the drawings, from the supply position illustrated in FIG. 4 to the filling position illustrated in FIG. 2A. The fill hole 20A1 is formed piercing through the bottom section 20A of the cylinder 20, however the foamed kneaded material a is viscous and so does not leak out from the fill hole 20A1.

The cylinder 20 is connected to the filling hole 16 of the mold 12, and so the internal space 22 is in communication with the pattern forming space 14 of the mold 12. Then, in a state in which the internal space 22 of the cylinder 20 is in communication with the pattern forming space 14 of the mold 12, the piston 26 disposed inside the cylinder 20 is moved toward the foamed kneaded material a side while opening the gas release hole 40A formed piercing through the piston 26 (second process). The air between the foamed kneaded material a and the piston 26 is thereby discharged from the gas release hole 40A. When this occurs, the piston 26 is moved under drive force of the advancing-retreating movement mechanism 28 (see FIG. 1), and the position of the piston 26 in the cylinder 20 is detected by the position detection sensor 34.

Figure 2B:
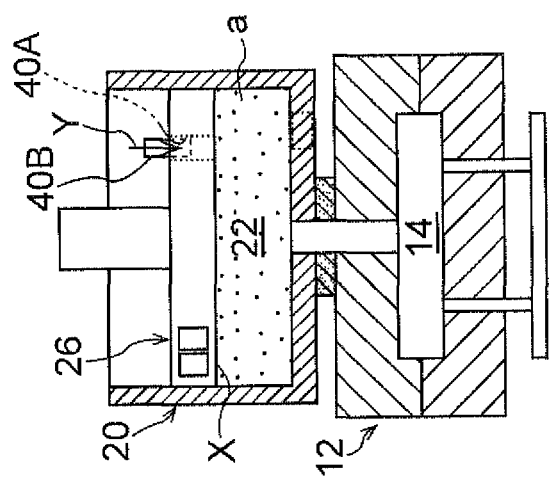
FIG. 2B is a schematic vertical cross-section illustrating a timing at which a gas release hole is closed in a process of a method for forming foamed kneaded material employing a device for forming foamed kneaded material according to the first exemplary embodiment of the present invention.

Next, as illustrated in FIG. 2B, the open-close plug 40B of the gas release hole 40A is closed at a timing when the piston 26 has reached the expected position X expected as the position when the piston 26 contacts the foamed kneaded material a supplied into the cylinder 20 (third process, see arrow Y). When this occurs, the open-close plug 40B is moved under drive force of the open-close drive mechanism 42 (see FIG. 1) from the open position opening the gas release hole 40A (see FIG. 2A) to the closed position closing the gas release hole 40A (see FIG. 2B).

Namely, in cases in which it is determined, based on the detection result of the position detection sensor 34, that the piston 26 has not yet reached the expected position X expected as the position when the piston 26 contacts the foamed kneaded material supplied into the cylinder 20, the controller 38 illustrated in FIG. 1 controls the open-close drive mechanism 42 to dispose the open-close plug 40B in the open position, and in cases in which it is determined, based on the detection result of the position detection sensor 34, that the piston 26 has reached the expected position X, the controller 38 controls the open-close drive mechanism 42 to dispose the open-close plug 40B in the closed position.

Figure 2C:
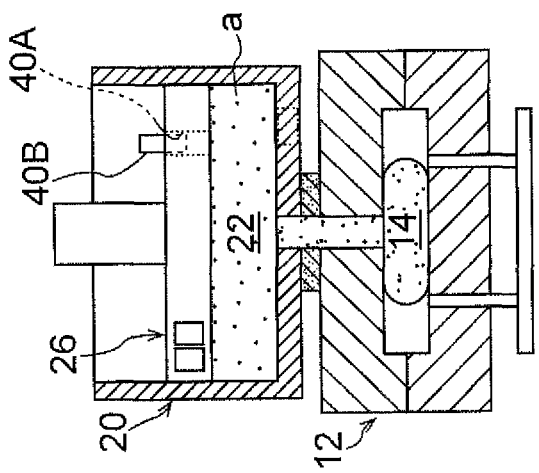
FIG. 2C is a schematic vertical cross-section illustrating a state partway through filling foamed kneaded material into a pattern forming space of a mold in a process of a method for forming foamed kneaded material employing a device for forming foamed kneaded material according to the first exemplary embodiment of the present invention.
Figure 2D:
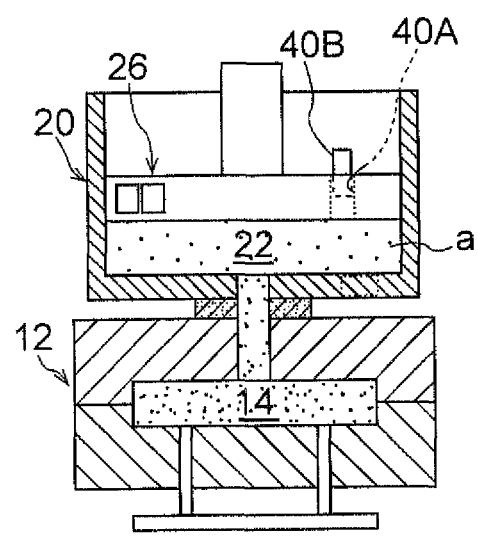
FIG. 2D is a schematic vertical cross-section illustrating a filled state of foamed kneaded material in a pattern forming space of a mold in a process of a method for forming foamed kneaded material employing a device for forming foamed kneaded material according to the first exemplary embodiment of the present invention.

Then, in the sequence FIG. 2C, FIG. 2D, the foamed kneaded material a supplied into the cylinder 20 is pressed to the pattern forming space 14 side of the mold 12 by moving the piston 26 to the foamed kneaded material a side (fourth process). When this occurs, the gas release hole 40A is closed, and so the piston 26 fills the pattern forming space 14 of the mold 12 with the foamed kneaded material a with an appropriate pressing force without leaks occurring in the foamed kneaded material from the gas release hole 40A. Any air between the foamed kneaded material a and the piston 26 has already been released, enabling poor filling caused by incorporation of air from between the foamed kneaded material a and the piston 26 into the pattern forming space 14 of the mold 12 to be prevented.

In the present exemplary embodiment, the movement speed of the piston 26 in the fourth process illustrated in FIG. 2C and FIG. 2D is also reduced compared to the movement speed of the piston 26 in the second process illustrated in FIG. 2A. Namely, the controller 38 illustrated in FIG. 1 controls advancing-retreating movement mechanism 28 such that the movement speed of the piston 26 when the open-close plug 40B is in the closed position to be slower than the movement speed of the piston 26 when the open-close plug 40B is in the open position.

In this manner, the movement speed of the piston 26 when the open-close plug 40B is in the open position illustrated in FIG. 2A (or in other words in the second process prior to the piston 26 contacting the foamed kneaded material a), is faster than the movement speed of the piston 26 when the open-close plug 40B is in the closed position illustrated in FIG. 2C and FIG. D (or in other words in the fourth process when the piston 26 has contacted the foamed kneaded material a), hence the processing time is shortened. The movement speed of the piston 26 when the open-close plug 40B is in the closed position (or in other words in the fourth process when the piston 26 has contacted the foamed kneaded material a) is made slower than the movement speed of the piston 26 when the open-close plug 40B is in the open position illustrated in FIG. 2A (or in other words in the second process prior to the piston 26 contacting the foamed kneaded material a), and hence the occurrence of poor filling and burring due to the filling speed being too fast is suppressed, thereby enabling the surface of patterns formed to be made more uniform.

Moreover, the movement speed of the piston 26 is detected by the speed detection sensor 36 illustrated in FIG. 1. The controller 38 controls the advancing-retreating movement mechanism 28 such that the movement speed detected by the speed detection sensor 36 matches a pre-set movement speed of the piston 26. This thereby enables the piston 26 to be moved at the desired speed, enabling the foaming condition of the foamed kneaded material to be maintained and the piston 26 to be moved such that burrs do not readily develop while filling the foamed kneaded material into the mold 12.

Moreover, in the present exemplary embodiment, the pressure acting on the foamed kneaded material inside the cylinder 20 is detected by the pressure detection sensor 48 provided at the bottom section of the cylinder 20. In cases in which it is determined, based on the detection result of the position detection sensor 34, that the piston 26 has reached the expected position X, the controller 38 controls the advancing-retreating movement mechanism 28 such that movement of the piston 26 is stopped if the pressure value detected by the pressure detection sensor 48 is the expected pressure value associated with completion of the foamed kneaded material being pressed by the piston 26, or higher. Unnecessary pressing force accordingly does not act on the foamed kneaded material supplied into the cylinder 20, enabling burring to be prevented from occurring on the pattern. The pressing of the piston 26 can be continued if the pressure value detected by the pressure detection sensor 48 is less than the expected pressure value associated with completion of the foamed kneaded material being pressed by the piston 26, enabling insufficient filling to be prevented.

FIG. 3A and FIG. 3B illustrate processes after pattern forming. After pattern forming, first, as illustrated in FIG. 3A, the pressurizing unit 18 of the cylinder 20 and so on is raised by the movement mechanism, not illustrated in the drawings. Then, finally, as illustrated in FIG. 3B, the pattern b formed by the foamed kneaded material a is removed from the mold 12.

As explained above, according to the foamed kneaded material forming device 10 illustrated in FIG. 1 and the method for forming foamed kneaded material, foamed kneaded material in a well foamed condition can be filled into the pattern forming space 14 of the mold 12, enabling stable good filling to be performed.

Note that since it is possible to monitor the movement speed, position, and pressing force of the piston 26 in the foamed kneaded material forming device 10 of the present exemplary embodiment, the foamed kneaded material forming device 10 may be employed to discover conditions (optimum movement speed, position, and pressure of the piston 26) for better filling. Namely, the foamed kneaded material forming device 10 is able to find conditions to reduce filling defects and burrs from occurring while filling the foamed kneaded material into the pattern forming space 14 of the mold 12, and is able to find filling conditions to eliminate air incorporation defects caused by the piston 26 pressing in air together with the foamed kneaded material.

Modified Example of First Exemplary Embodiment

Explanation next follows regarding a modified example of the first exemplary embodiment above. The modified example of the first exemplary embodiment is configured similarly to the first exemplary embodiment, except in that control logic of the controller 38 differs therefrom.

In cases in which the pressure value detected with the pressure detection sensor 48 is less than an expected pressure value associated with the foamed kneaded material first starting to be pressed by the piston 26, the controller 38 of the modified example controls the open-close drive mechanism 42 so as to dispose the open-close plug 40B in the open position. In cases in which the pressure value detected with the pressure detection sensor 48 is the expected pressure value associated with the foamed kneaded material first starting to be pressed by the piston 26, or higher, the controller 38 of the modified example controls the open-close drive mechanism 42 so as to dispose the open-close plug 40B in the closed position.

Namely, instead of the third process of the first exemplary embodiment, in the third process of the modified example the gas release hole 40A is closed by the open-close plug 40B at a timing when the pressing force acting on the foamed kneaded material has reached the expected pressure value when pressing first starts to act on the foamed kneaded material from the piston 26.

The controller 38 of the modified example also controls the advancing-retreating movement mechanism 28 so as to stop movement of the piston 26 in cases in which it is determined, based on the detection result of the position detection sensor 34, that the piston 26 has reached the expected position X, this being the position where the piston 26 is expected to make contact with the foamed kneaded material supplied inside the cylinder 20, and in cases in which the pressure value detected by the pressure detection sensor 48 is the expected pressure value associated with completion of the foamed kneaded material being pressed by the piston 26 is complete, or higher.

Thus the modified example is also able to fill the foamed kneaded material into the pattern forming space 14 of the mold 12 in a well foamed condition.

Second Exemplary Embodiment

Figure 5:
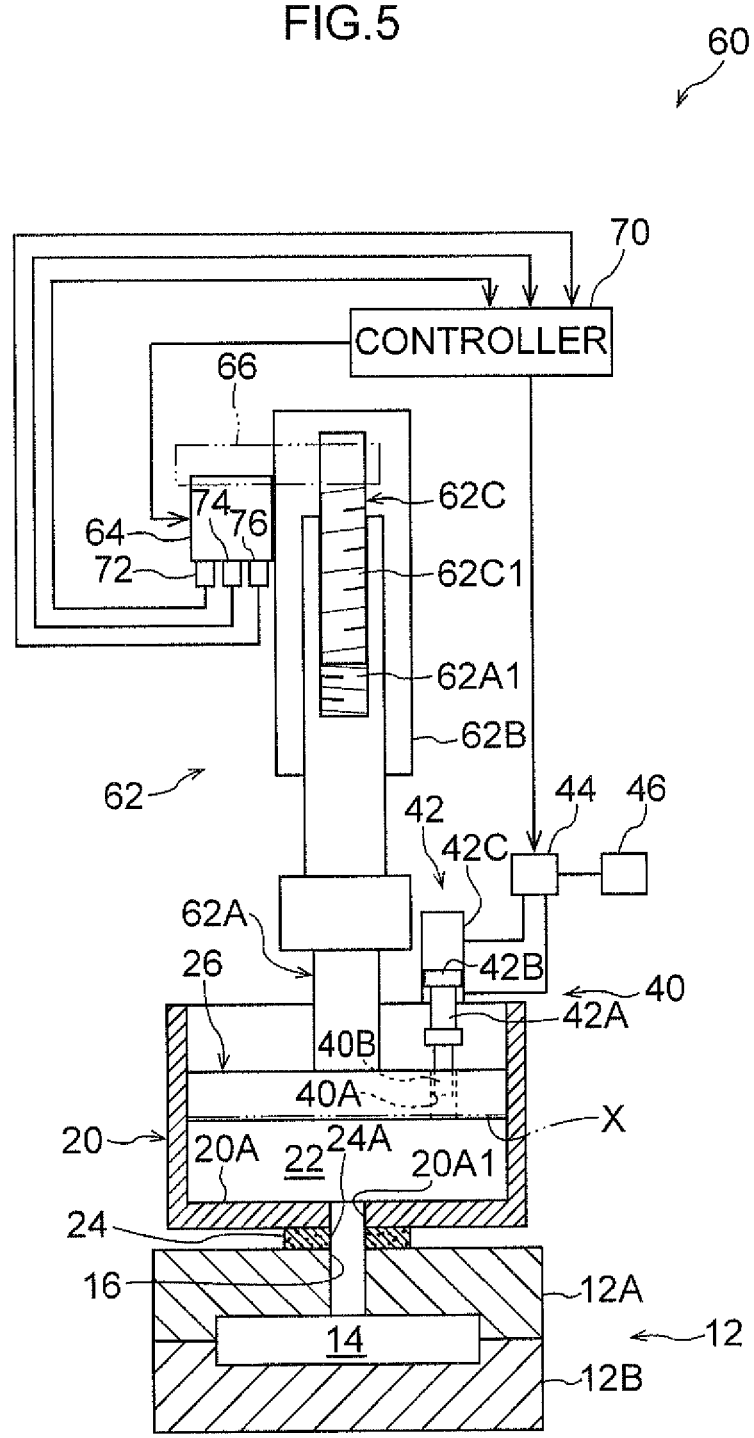
FIG. 5 is schematic vertical cross-section illustrating relevant portions of a device for forming foamed kneaded material according to a second exemplary embodiment of the present invention.

Explanation next follows regarding a device for forming foamed kneaded material and a method for forming foamed kneaded material according to a second exemplary embodiment of the present invention, with reference to FIG. 5. FIG. 5 illustrates a schematic vertical cross-section of relevant portions of a foamed kneaded material forming device 60 according to the second exemplary embodiment. As illustrated in the drawings, the foamed kneaded material forming device 60 differs from the foamed kneaded material forming device 10 of the first exemplary embodiment (see FIG. 1) in the point that an advancing-retreating movement mechanism 62 (electric-powered cylinder mechanism) is provided in place of the advancing-retreating movement mechanism 28 (air cylinder mechanism, see FIG. 1). It also differs from the foamed kneaded material forming device 10 of the first exemplary embodiment (see FIG. 1) in that a position detection sensor 72 provided as a position detection section in place of the position detection sensor 34 (see FIG. 1), a speed detection sensor 74 provided as a speed detection section in place of the speed detection sensor 36 (see FIG. 1), and a pressure detection sensor 76 provided as a pressure detection section in place of the pressure detection sensor 48, are respectively installed inside the advancing-retreating movement mechanism 62 (see FIG. 1). Other configuration is substantially the same as that of the first exemplary embodiment. Substantially the same configuration portions to those of the first exemplary embodiment are allocated the same reference numerals and further explanation is omitted thereof.

As illustrated in FIG. 5, the piston 26 is attached to the leading end portion (lower end portion) of a rod 62A of the advancing-retreating movement mechanism 62. The structure of the advancing-retreating movement mechanism 62 is a known electric-powered cylinder mechanism and so further detailed explanation is omitted thereof, and a simplified explanation follows.

The rod 62A is disposed with its axial direction along the up-down direction. An upper portion of the rod 62A is disposed inside a cylinder 62B, and a female thread portion 62A1 is formed to the upper portion. The female thread portion 62A1 of the rod 62A meshes with a male thread portion 62C1 of a ball thread 62C, and the rod 62A is placed so as to not be relatively rotatable about the up-down direction axis with respect to the cylinder 62B. The ball thread 62C is disposed with the axial direction in the up-down direction, and is rotatable about the axis.

The rod 62A is capable of relative movement (to-and-fro movement in the up-down direction) with respect to the cylinder 62B by rotating the ball thread 62C inside the cylinder 62B. Namely, the rod 62A of the advancing-retreating movement mechanism 62 performs to-and-fro movement in the up-down direction, and the piston 26 is configured interlocked thereto so as to move in the up-down direction.

The advancing-retreating movement mechanism 62 is equipped with an electrically powered servomotor 64. The electrically powered servomotor 64 is employed to rotationally drive the ball thread 62C, and the motor shaft is connected to the ball thread 62C through a gear train 66. The electrically powered servomotor 64 is connected to a controller 70. The controller 70 is configured equipped with an electrical circuit including a CPU or the like, and the high precision control of movement of the rod 62A enabled by controlling the electrically powered servomotor 64. The advancing-retreating movement mechanism 62 provided at the piston 26 is thereby able to cause advancing-retreating movement of the piston 26 in the direction to press the foamed kneaded material that has been supplied into the cylinder 20 (the direction toward the bottom section 20A side), and in the opposite direction thereto.

The position detection sensor 72 is installed in the advancing-retreating movement mechanism 62 to detect the position of the piston 26 in the cylinder 20. The position detection sensor 72 is connected to the controller 70 and outputs a signal to the controller 70 according to the up-down direction position of the piston 26 in the cylinder 20.

The speed detection sensor 74 is installed in the advancing-retreating movement mechanism 62 to detect the movement speed of the piston 26. The speed detection sensor 74 is connected to the controller 70 and outputs a signal to the controller 70 according to the movement speed of the piston 26.

The pressure detection sensor 76 is installed to the advancing-retreating movement mechanism 62 to detect the pressing force acting on the foamed kneaded material in the cylinder 20. The pressure detection sensor 76 is connected to the controller 70 and outputs a signal to the controller 70 according to the pressing force acting on the foamed kneaded material in the cylinder 20.

Even though the controller 70 differs from the first exemplary embodiment in that it controls the electrically powered servomotor 64 instead of the air direction control device 30 of the first exemplary embodiment (see FIG. 1), and has connections to different detection sections (the position detection sensor 72, the speed detection sensor 74, and the pressure detection sensor 76), the controller 70 controls the advancing-retreating movement mechanism 62 and the open-close drive mechanism 42 with control logic that is similar to that of the controller 38 of the first exemplary embodiment (see FIG. 1).

It is possible to employ the foamed kneaded material forming device 60 in the present exemplary embodiment to implement a similar method to the method for forming foamed kneaded material of the first exemplary embodiment. Similar operation and advantageous effects can be achieved to those of the first exemplary embodiment. The configuration of the present exemplary embodiment has the advantage of being able to control the position of the piston 26 with higher precision than the configuration of the first exemplary embodiment.

As a modified example of the present exemplary embodiment, an open-close drive mechanism for an electrically powered cylinder mechanism may be provided instead of the open-close drive mechanism 42. Moreover, as another modified example of the present exemplary embodiment, the controller 70 may control the advancing-retreating movement mechanism 62 and the open-close drive mechanism 42 with similar control logic to the modified example of the first exemplary embodiment.

Supplementary Explanation for the Exemplary Embodiments

In the above first exemplary embodiment, the advancing-retreating movement mechanism 28 illustrated in FIG. 1 is configured by an air cylinder mechanism, and in the above second exemplary embodiment, the advancing-retreating movement mechanism 62 illustrated in FIG. 5 is configured by an electric-powered cylinder mechanism; however, the advancing-retreating movement mechanism may, for example, be configured by another advancing-retreating movement mechanism, such as a hydraulic mechanism or the like. The open-close drive mechanism may also, for example, be configured by an open-close drive mechanism such as a hydraulic cylinder mechanism or the like.

In the above exemplary embodiments, in cases in which the controllers 38, 70 illustrated in FIG. 1 and FIG. 5 determine, based on the detection result of the position detection sensor 34, that the piston 26 has reached the expected position X where the piston 26 is expected to be positioned when contacting the foamed kneaded material supplied into the cylinder 20, the controllers 38, 70 control the advancing-retreating movement mechanisms 28, 62 such that movement of the piston 26 is stopped if the pressure value detected by the pressure detection sensor 48 has reached the expected pressure value for when pressing of the foamed kneaded material by the piston 26 has been completed, or higher. However, a configuration not performing such control may be adopted.

In the above exemplary embodiments, the speed detection section (the speed detection sensor 36, the speed detection sensor 74) is provided to detect the movement speed of the piston 26, and such a configuration is preferable. However, it is also possible to adopt a configuration not provided with a speed detection section.

In the above exemplary embodiments, the controllers 38, 70 control the advancing-retreating movement mechanisms 28, 62 such that the movement speed of the piston 26 is slower when the open-close plug 40B is in the closed position (the fourth process) than the movement speed of the piston 26 when the open-close plug 40B is in the open position (the second process). However, such control logic (method for forming foamed kneaded material) need not be adopted in cases, for example, in which there is no need to shorten the processing time.

As a modified example of the above first exemplary embodiment, the position detection sensor 34 and the speed detection sensor 36 illustrated in FIG. 1 may be installed on the cylinder 20, or may be installed on the rod 28A.

Appropriate combinations of the above exemplary embodiments and the plural modified examples are also possible.

The entire content of Japanese Patent Application No. 2012-142332 is also incorporated by reference within the present specification.

The invention claimed is:

1. A device for forming foamed kneaded material comprising:
   a mold having a pattern forming space and a fill hole;
   a cylinder having an internal space capable of being supplied with foamed kneaded material, the internal space communicating with the pattern forming space by connecting the cylinder to the fill hole;
   a piston that presses foamed kneaded material supplied into the cylinder toward the pattern forming space side of the mold;
   an advancing-retreating movement mechanism that is provided at the piston, and that advances or retreats the piston in a direction to press the foamed kneaded material supplied into the cylinder or in an opposite direction thereto;
   a gas release mechanism including a gas release hole that penetrates through the piston along a piston advancing-retreating movement direction, an open-close section that is capable of moving between a closed position that closes the gas release hole and an open position that opens the gas release hole, and an open-close drive mechanism that moves the open-close section between the closed position and the open position;
   a position detection section that detects a position of the piston in the cylinder; and
   a controller that controls the open-close drive mechanism such that the open-close section is disposed in the open position during a compression stroke of the piston in cases in which it has been determined, based on a detection result of the position detection section, that the piston has not yet reached an expected position where the piston is expected to be positioned on contacting the foamed kneaded material supplied into the cylinder, and that controls the open-close drive mechanism such that the open-close section is disposed in the closed position in cases in which it has been determined, based on a detection result of the position detection section, that the piston has reached the expected position.

2. The device for forming foamed kneaded material of claim 1, wherein:
   a pressure detection section is provided to detect pressing force acting on the foamed kneaded material in the cylinder; and
   in cases in which it has been determined, based on the detection result of the position detection section, that the piston has reached the expected position, the controller controls the advancing-retreating movement mechanism such that movement of the piston is stopped in cases in which a pressure value detected by the pressure detection section is an expected pressure value associated with completion of the foamed kneaded material being pressed by the piston, or higher.

3. The device for forming foamed kneaded material of claim 2, wherein:
a speed detection section is provided to detect a movement speed of the piston; and
the controller controls the advancing-retreating movement mechanism such that a movement speed detected by the movement speed detection section matches a pre-set movement speed of the piston.

4. The device for forming foamed kneaded material of claim 2, wherein:
the controller controls the advancing-retreating movement mechanism such that a movement speed of the piston, in cases in which the open-close section is in the closed position, is slower than a movement speed of the piston in cases in which the open-close section is in the open position.

5. The device for forming foamed kneaded material of claim 1, wherein:
a speed detection section is provided to detect a movement speed of the piston; and
the controller controls the advancing-retreating movement mechanism such that a movement speed detected by the movement speed detection section matches a pre-set movement speed of the piston.

6. The device for forming foamed kneaded material of claim 5, wherein:
the controller controls the advancing-retreating movement mechanism such that a movement speed of the piston, in cases in which the open-close section is in the closed position, is slower than a movement speed of the piston in cases in which the open-close section is in the open position.

7. The device for forming foamed kneaded material of claim 1, wherein:
the controller controls the advancing-retreating movement mechanism such that a movement speed of the piston, in cases in which the open-close section is in the closed position, is slower than a movement speed of the piston in cases in which the open-close section is in the open position.

8. A device for forming foamed kneaded material comprising:
a mold having a pattern forming space and a fill hole;
a cylinder having an internal space capable of being supplied with foamed kneaded material, the internal space communicating with the pattern forming space by connecting the cylinder to the fill hole;
a piston that presses foamed kneaded material supplied into the cylinder toward the pattern forming space side of the mold;
an advancing-retreating movement mechanism that is provided at the piston, and that advances or retreats the piston in a direction to press the foamed kneaded material supplied into the cylinder or in an opposite direction thereto;
a gas release mechanism including a gas release hole that penetrates through the piston along a piston advancing-retreating movement direction, an open-close section that is capable of moving between a closed position that closes the gas release hole and an open position that opens the gas release hole, and an open-close drive mechanism that moves the open-close section between the closed position and the open position;
a pressure detection section that detects pressing force acting on the foamed kneaded material in the cylinder; and
a controller that controls the open-close drive mechanism such that the open-close section is disposed in the open position during a compression stroke of the piston in cases in which a pressure value detected by the pressure detection section is less than an expected pressure value associated with the foamed kneaded material starting to be pressed by the piston, and that controls the open-close drive mechanism such that the open-close section is disposed in the closed position in cases in which a pressure value detected by the pressure detection section is the expected pressure value, or higher.

9. The device for forming foamed kneaded material of claim 8, wherein:
a position detection section is provided at detect the position of the piston in the cylinder; and
in cases in which it has been determined, based on the detection result of the position detection section, that the piston has reached an expected position where the piston is expected to be on contacting the foamed kneaded material supplied into the cylinder, the controller controls the advancing-retreating movement mechanism such that movement of the piston is stopped in cases in which a pressure value detected by the pressure detection section is an expected pressure value associated with completion of the foamed kneaded material being pressed by the piston, or higher.

10. The device for forming foamed kneaded material of claim 9, wherein:
a speed detection section is provided to detect a movement speed of the piston; and
the controller controls the advancing-retreating movement mechanism such that a movement speed detected by the movement speed detection section matches a pre-set movement speed of the piston.

11. The device for forming foamed kneaded material of claim 9, wherein:
the controller controls the advancing-retreating movement mechanism such that a movement speed of the piston, in cases in which the open-close section is in the closed position, is slower than a movement speed of the piston in cases in which the open-close section is in the open position.

12. The device for forming foamed kneaded material of claim 8 wherein:
a speed detection section is provided to detect a movement speed of the piston; and
the controller controls the advancing-retreating movement mechanism such that a movement speed detected by the movement speed detection section matches a pre-set movement speed of the piston.

13. The device for forming foamed kneaded material of claim 8, wherein:
the controller controls the advancing-retreating movement mechanism such that a movement speed of the piston, in cases in which the open-close section is in the closed position, is slower than a movement speed of the piston in cases in which the open-close section is in the open position.

* * * * *